United States Patent
Pao et al.

(10) Patent No.: US 12,496,607 B2
(45) Date of Patent: Dec. 16, 2025

(54) RAIN SIMULATION SYSTEM

(71) Applicant: Magna Exteriors Inc., Concord (CA)

(72) Inventors: Wing Yi Pao, Oshawa (CA); Long Li, Oshawa (CA); Martin Agelin-Chaab, Oshawa (CA); Julian Knutzen, Aurora (CA); Alexis Baltazar-y-Jimenez, Rochester Hills, MI (US)

(73) Assignee: Magna Exteriors Inc., Aurora (CA)

( * ) Notice: Subject to any disclaimer, the term of this patent is extended or adjusted under 35 U.S.C. 154(b) by 492 days.

(21) Appl. No.: 17/994,886

(22) Filed: Nov. 28, 2022

(65) Prior Publication Data
US 2023/0166282 A1 Jun. 1, 2023

Related U.S. Application Data

(60) Provisional application No. 63/283,793, filed on Nov. 29, 2021.

(51) Int. Cl.
*B05B 15/62* (2018.01)
*B05B 1/20* (2006.01)
(Continued)

(52) U.S. Cl.
CPC .............. *B05B 15/62* (2018.02); *B05B 1/205* (2013.01); *B05B 9/007* (2013.01); *B05B 12/002* (2013.01);
(Continued)

(58) Field of Classification Search
CPC ......... B05B 15/62; B05B 1/205; B05B 9/007; B05B 12/002; B05B 12/004;
(Continued)

(56) References Cited

U.S. PATENT DOCUMENTS

| 1,103,490 A | 7/1914 | Cordray |
| 2,740,663 A | 4/1956 | Pomykala |
| (Continued) | | |

FOREIGN PATENT DOCUMENTS

| CN | 202538992 U | 11/2012 |
| CN | 102179331 B | 8/2013 |
| (Continued) | | |

OTHER PUBLICATIONS

An automated laboratory rainfall simulation system with controlled rainfall intensity, raindrop energy and soil drainage, Hignett et al. (Year: 1995).*

*Primary Examiner* — Jacques M Saint Surin
(74) *Attorney, Agent, or Firm* — Reising Ethington P.C.

(57) ABSTRACT

A rain simulation system that replicates realistic raindrop characteristics for controlled testing is invented. The rain simulation system can be used as a stand-alone system with wind using a blower fan or in a wind tunnel, and without wind to create wind-driven and vertically falling rain droplets, respectively. In addition, methods to simulate rainfall for stationary and moving objects such as a road passenger vehicle are proposed. The rain simulation system is fully adjustable for a range of droplet size, impact velocity, rain intensity, rain coverage via the use of dripping nozzle devices and positioning of system components. The rain simulation system dispenses distinct droplets or continuous streams that can be broken down into droplets by wind. A rain nozzle device is coupled with a rain reservoir, and multiple nozzles are used to create a rain matrix, the full matrix is integrated with a rain rack and rainwater flow control strategy.

41 Claims, 8 Drawing Sheets

(51) Int. Cl.
    *B05B 9/00*     (2006.01)
    *B05B 12/00*    (2018.01)
    *B05B 12/08*    (2006.01)
    *B05B 15/25*    (2018.01)
    *G01M 17/007*   (2006.01)
(52) U.S. Cl.
    CPC .......... *B05B 12/004* (2013.01); *B05B 12/087* (2013.01); *B05B 15/25* (2018.02); *G01M 17/007* (2013.01)
(58) Field of Classification Search
    CPC ......... B05B 12/087; B05B 15/25; B05B 1/20; B05B 7/28; B05B 13/0415; B05B 12/008; B05B 1/3013; G01M 17/007
    USPC ...................................................... 78/118.01
    See application file for complete search history.

(56)                References Cited

U.S. PATENT DOCUMENTS

| 4,627,950  | A   |          | 12/1986 | Matsui              |            |
|------------|-----|----------|---------|---------------------|------------|
| 5,143,107  | A   |          | 9/1992  | Kelley              |            |
| 5,249,151  | A   |          | 9/1993  | Chang               |            |
| 7,844,427  | B1  | *        | 11/2010 | Crawford ........... | G01W 1/10  |
|            |     |          |         |                     | 702/3      |
| 8,794,341  | B2  |          | 8/2014  | Howard, Sr.         |            |
| 8,903,121  | B2  | *        | 12/2014 | Heenan ............. | B60S 1/0822|
|            |     |          |         |                     | 382/104    |
| 9,739,711  | B2  | *        | 8/2017  | Hamilton ........... | F41H 9/06  |
| 9,846,092  | B2  | *        | 12/2017 | Kubicek ............ | G01W 1/00  |
| 12,196,914 | B2  | *        | 1/2025  | Leonard ............ | G01J 1/42  |
| 2008/0179426 | A1 |         | 7/2008  | Johnson             |            |
| 2015/0162854 | A1 |         | 6/2015  | Blaunshtein et al.  |            |
| 2016/0165813 | A1 |         | 6/2016  | Wilkins             |            |

FOREIGN PATENT DOCUMENTS

| CN | 204008636  | U  | 12/2014 |
|----|------------|----|---------|
| CN | 204380884  | U  | 6/2015  |
| EP | 1709864    | A1 | 10/2006 |
| EP | 1638388    | B1 | 1/2008  |
| WO | 2008062441 | A2 | 5/2008  |

* cited by examiner

RAIN SIMULATION SYSTEM

CROSS-REFERENCE TO RELATED APPLICATIONS

This application is a Non-Provisional Patent Application and claims benefit of U.S. Provisional Patent Application No. 63/283,793, filed Nov. 29, 2021. The disclosure of the above application is incorporated herein by reference.

FIELD OF THE INVENTION

This invention relates to a system and component design for rain simulation, and a method to simulate rainfall around a moving object such as a road passenger vehicle that is moving at different speeds through different rain conditions. The rain simulation system can be used for (but not limited to) evaluating sensor performances on modern and autonomous vehicles when driving in rain.

BACKGROUND OF THE INVENTION

The technology of autonomous driving requires testing in adverse weather conditions to ensure safe navigation. Rain is one of the most ubiquitous hazardous situations which reduces visibility drastically and can cause road accidents. Autonomous vehicles heavily rely on sensors to capture traffic data including identifying obstacles and the distance from obstacles; however, raindrops can interfere with sensor signals such that they produce faulty commands to the vehicle's autonomous driving system. Therefore, understanding how sensors behave under different rain conditions is an essential task for autonomous vehicle development.

Outdoor testing is the most realistic but difficult to control as there are too many variables, the desired conditions also do not occur frequently for efficient testing. Therefore, in order to increase understanding of how sensors behave it is necessary to be able to accurately simulate adverse weather conditions, namely natural rainfall in a laboratory environment. Existing solutions only produce horizontal rain droplets of small diameter but not realistic vertical rainfall.

To overcome the mentioned issue, several have proposed to stimulate rainfall in the natural environment. In the past, gallons of water are brought up to the sky in hot air balloons and fall as artificial raindrops (U.S. Pat. No. 1,103,490A, 1914). Also, devices were invented to circulate humid air with propellers such that the moisture becomes concentrated to form miniature storm and rainfall (U.S. Pat. No. 2,740,663A, 1956). Additionally, there were cloud forming strategies. Liquefied carbonic-acid gas was being shot up to the sky to evaporate moisture in the atmosphere to form clouds and stimulate rainfall (U.S. Pat. No. 462,795A, 1891). Further, laser was used to trigger lightning and naturally causing condensation, cloud formation, and rainfall (WO2008062441A3, 2008). Electrically conducting elements were used to stimulate cloud formation such that rain falls naturally (US20150162854A1, 2015). Some have used aircrafts to alter the atmosphere to unleash precipitation. The aircrafts spray water droplets to control the size in the clouds (EP1638388B1, 2008), and consists of a system to induce moisture condensation to induce rainfall (US20160165813A1, 2016).

While the above described methods can induce natural rain conditions, they are not suitable for controlled testing as the conditions may not be completely repeatable. An artificial rain simulator system that can produce realistic rain conditions and be used in both indoor/outdoor is needed.

Realistic rain characteristics include droplet size distribution, rain impact velocity, rain intensity, and rain impact angle. Existing systems typically are equipped with water supply, control components, and spray nozzles to produce distinct droplets to cover an area. The problems of the existing systems include the inability to control all the realistic characteristics at the same time due to the shortcomings of the systems and not being modular enough for all desired testing conditions. For example, an array of spray nozzles produces uneven rain intensity distribution across an area, and mist droplets that are too small to be classified as raindrops. On the other hand, to test objects of different sizes at different locations, as well as using different main water sources, modularity and water flow control are essential features for a successful rain simulation system.

It is therefore an object of the invention to artificially produce realistic and reproducible vertical rain conditions inside a climatic wind tunnel to evaluate Advanced Driver Assistance Sensors (ADAS) like LIDAR, in adverse weather and soiling conditions, including wind, rain, snow and combinations.

Additionally, it is an object of the present invention, to make the proposed system modular and portable.

Additionally, it is an object of the present invention to provide precise flow control.

Additionally, it is an object of the present invention to generate variable rain conditions including droplet size and rain intensity.

Additionally, it is an object of the present invention to make it capable of simulating rain conditions for both stationary and moving objects where the perceived intensity, impact angle and impact velocity are required.

SUMMARY OF THE INVENTION

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

The invention can be better understood as a horizontal rain umbrella that is equipped with liquid hoses and nozzles to produce rainfall where the rain droplets can be controlled to match different rain scenarios found in nature (light rain, moderate rain, heavy rain).

Provided in the present invention is a rain simulation system which includes a series of nozzle assemblies for providing a vertical pattern of rain droplets. Each nozzle assembly is manually adjustable to control pressure and now exiting an outlet of the nozzle assembly. Connected to the nozzle assemblies is reservoir assembly for feeding liquid to the nozzle assemblies. The reservoir assembly is mounted to a support rack and is positionable about the X, Y and Z axis on the support rack. Connected to the reservoir assembly is a rain system master flow control for controlling the flow of liquid and content of the liquid inputted to the reservoir assembly. Liquid entering an inlet of the rain system master low control is diverted to a mixing chamber where other components can be added and mixed.

The rain simulation system that replicates realistic raindrop characteristics for controlled testing on stationary vehicles in provided. The rain simulation system can be used as a stand-alone system with wind using a blower fan or in a wind tunnel, and without wind to create wind-driven and vertically falling rain droplets, respectively. In addition, methods to simulate rainfall for stationary and moving objects such as a road passenger vehicle are proposed. The rain simulation system is fully adjustable for a range of droplet size, impact velocity, rain intensity, rain coverage via the use of dripping nozzle devices and positioning of system components. The rain simulation system dispenses distinct droplets or continuous streams that can be broken down into droplets by wind. A rain nozzle device is coupled with a rain reservoir, and multiple nozzles are used to create a rain matrix, the full matrix is integrated with a rain rack and rainwater flow control strategy.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
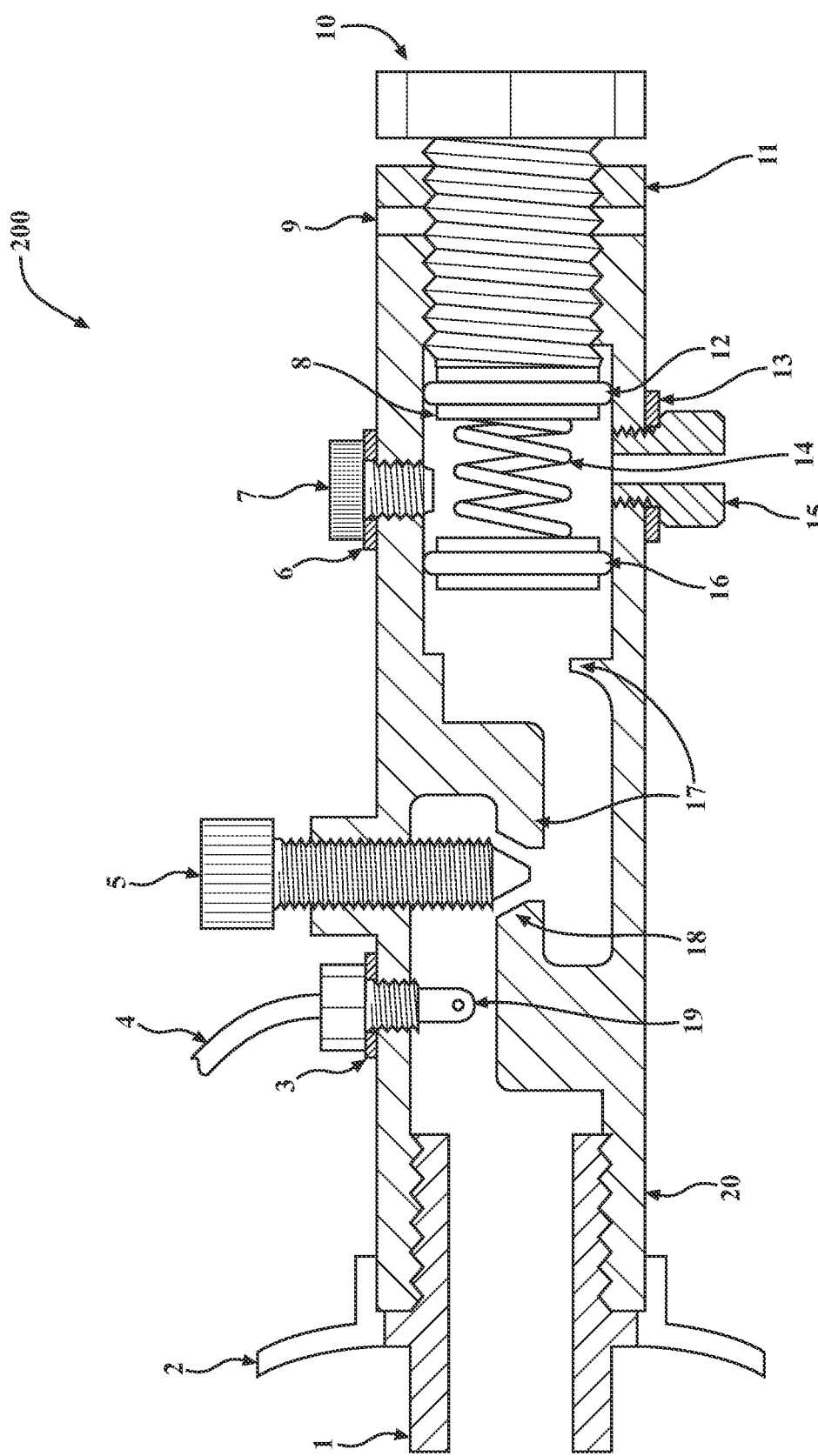
FIG. 1 is a partial section side view of the nozzle assembly. The figure illustrates internal components, labeled. Certain components are sectioned while others are not for demonstration purposes only. The figure is not drawn to scale.

The following description of the preferred embodiment(s) is merely exemplary in nature and is in no way intended to limit the invention, its application, or uses.

Throughout this application reference is made to the term liquid being used in the rain simulation system. The term liquid as used herein is used to describe water and any other liquid, as well as mixtures of liquids and solids, all of which might be used for performing various experiments using the rain simulation system.

The present invention proposes a simple and modular strategy to generate realistic artificial rainfall. Electronic controls and feedback from various sensors for system components may be implemented if desired, however, the proposed rain system can function using mechanical controls. The construction of the rain simulation system is not limited by component material selection nor limited by changes made to the construction to accommodate specific testing environment.

The present invention of a realistic rain simulation system consists of rain nozzles, rain reservoirs, rain system support rack, and rainwater flow control components. The rain simulation system can be a stand-alone system to be used in both indoor/outdoor where droplets fall down vertically, and the matrix of rain reservoirs and rain nozzles that are held on the rain system support rack is sized to fit the test area or object of interest. The rain simulation system can be setup long enough to allow the test object to move through a region of rain. The rain simulation system can also be used with natural wind conditions.

To simulate the perceived rain conditions on a moving test object, wind tunnel or a blower fan can be used to produce wind-driven rain onto the test object that is placed stationary in the test section. In the wind-driven rain conditions, rainwater is dispensed from the rain nozzle, the rainwater may fall for a certain distance before being deflected by wind, or the rain nozzle may be placed within the wind stream to be deflected immediately upon being dispensed.

As mentioned previously, realistic rain characteristics that a moving object perceives include perceived rain intensity where the frontal area of the object experiences more rain when it is moving faster, perceived rain angle where it is relative between a horizontally moving object and a vertically falling raindrop, droplet size, and droplet impact velocity. Sometimes it is difficult to simulate all the mentioned characteristics when the test object is placed stationary inside the test section due to the limited space of test section, or flow capacity of the wind tunnel/blower fan; a testing strategy is proposed to decouple the rain from the aerodynamics. The rain system can be set up for different perceived moving speeds while holding the wind tunnel/blower fan speed constant at a lower speed to maintain a controlled environment, whereas the perceived rain intensity is varied. Rain angles and impact velocities may be varied via positioning of the rain system and droplet size, in general, smaller droplets deflect more under wind and would require a higher falling height as compared to larger droplets, whereas lower falling height would result in a higher horizontal velocity.

In addition, the perceived simulation strategy can be divided into categories to group a range of moving speeds in each condition. For example, the identical perceived rain intensity can be used for moving at 50 km/hr in natural heavy rain, moving at 75 km/hr in natural moderate rain, and moving at 100 km/hr in light rain.

The following describes the components and features of the rain simulation system. The rain simulation system includes four essential subassemblies to ensure the achievability of adjustment in all mentioned parameters. However, the system can be modified to bypass certain components to achieve a simpler design, this may result in limited parameter adjustments and will lose the ability to fine control. Vice versa, the system can be modified to integrate add-on subsystems to increase parameter adjustability, finer parameter control strategy, or to suit unique testing needs. The rain simulation system concept sets a foundation for further improvement. The possibility of the rain simulation system and its components are not limited to the following description.

Figure 2:
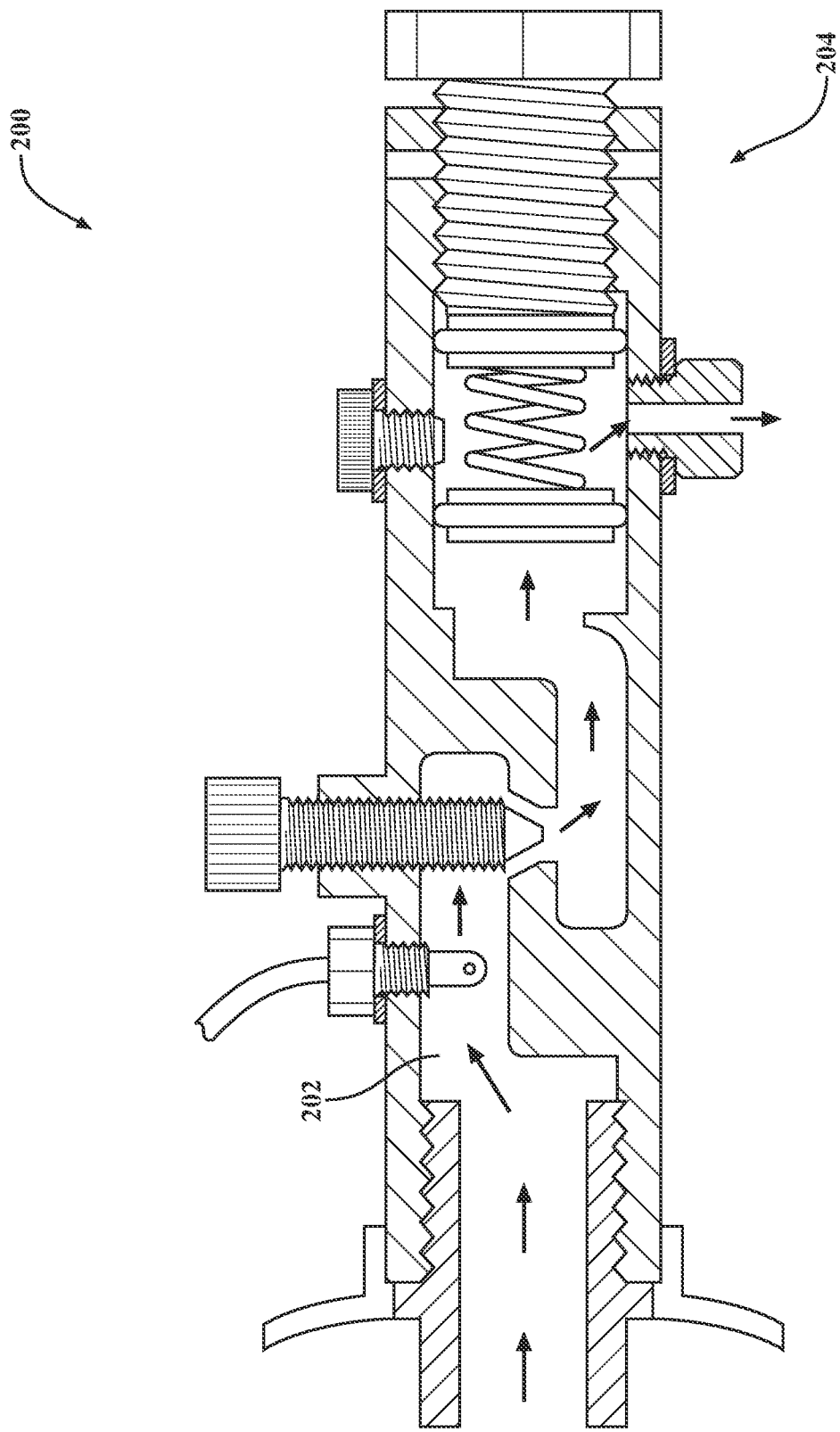
FIG. 2 is a partial section side view of the nozzle assembly. The figure illustrates the internal flow path and direction of liquid. The figure is not drawn to scale.

FIG. 1 is a partial section view of a nozzle assembly 200, illustrating the internal components. The nozzle assembly 200 contains multiple internal components to allow for variable mode selections for streams and droplets and adjustability in flow rate and degree of pressure compensation. The flow path and direction within the internal construction of the rain nozzle in FIG. 2. The rain nozzle functions as the outlet of the rain system with various control and compensation strategies. Rain streams and droplets are ultimately controlled by the rain nozzle. A body 20 of the nozzle assembly offers threading to accept multiple standardized fitting styles to suit specific applications of an inlet 1 of the nozzle assembly 200. The inlet 1 can be either connected to a reservoir assembly 300, so that the nozzle assembly 200 is an outlet of the reservoir assembly 300, or independent tubing is used to connect the nozzle assembly 200 to the reservoir assembly 300. When connected directly to the reservoir assembly 200, the mating surface is the outer shell of the body of the reservoir assembly 200. A sealing seat 2 is present at the outer surface of the inlet fitting, where it presses on the mating surface.

The nozzle assembly 200 offers adjustability in flow rate. Liquid from the inlet 1 enters an internal channel 202 of the nozzle assembly 200 and meets a flow rate controlling adjustment screw 5. The flow rate controlling adjustment screw 5 controls the opening of the internal channel 18 to allow or provide blockage to the liquid flow, controlling the flow of liquid. Adjustment of the flow rate controlling adjustment screw 5 is performed externally by physically turning flow rate controlling adjustment screw 5 inboard or outboard, or electronic control by controlling the flow rate controlling adjustment screw 5 through a solenoid servo can be implemented. Internal channels may be customized to maximize or minimize flow turbulence depending on need, which does not affect the concept of the rain nozzle.

The nozzle assembly 200 further offers a degree of pressure compensation. Once the flow of liquid surpasses the flow control adjustment screw, a pressure compensation mechanism 204 provides pressure compensation to reduce undesired pressure surges and target initial velocity of the liquid flow through an outlet 15 of the nozzle assembly 200. The pressure compensation mechanism 204 includes two plates connected by a spring 14. An orifice is located at the center of the front plate 16. The orifice provides an additional flow control and ensures the flow to the outlet 15 is constant in flow rate. If the liquid flow pushing against the solid surface of the front plate with pressure beyond the spring rate threshold, displacement of the spring occurs. The compression of the spring alleviates and compensates the excess pressure of the liquid flow. The internal channel is designed to contain stoppers 17 to limit the maximum range of motion for the front plate. O-rings 12, 16 are used on both plates to prevent undesired liquid leakage.

Contacting the base plate 8 of the pressure compensation mechanism, a threaded bolt 10 is located. The bolt acts as a fine adjustment knob to intentionally increase or decrease the compression of the spring, changing the pressure threshold of the liquid flow to displace the spring and changing the pressure regulation of the liquid flowing through the outlet. If the adjustment provided by the bolt is out of range, it is possible to change the spring to different spring rate. A sealing washer 9 and a locking nut 11 share the thread of the compensation adjustment bolt, working in conjunction to prevent liquid leakage. The outlet 15 found at the exit of the nozzle assembly 200 is a threaded modified bolt-like outlet insert downstream of the pressure compensation mechanism 204. The threaded modified bolt-like outlet provides modularity so that outlets of different sizes can be inserted to provide different droplet sizes of the liquid exiting the outlet port 15. The bolt-like insert has an exit hole at its center. The hole size can be customized to vary the exit stream or droplet diameter, with regards to testing requirement. Throughout the body of the rain nozzle, sensor ports are built in to accept various sensors 19 such as pressure sensor, flow rate sensor, etc., or can be closed using a threaded plug 7. The sensors can be either wireless or cable-wired 4 to transmit data. Sealing washers 3, 6, 13 are used on the exterior of the rain nozzle when needed to prevent liquid leakage. All of the above features and adjustments allow the nozzle assembly 200 to be adjusted to provide a desired flow rate and degree of pressure of the rain droplets exiting the nozzle assembly 200.

Figure 3:
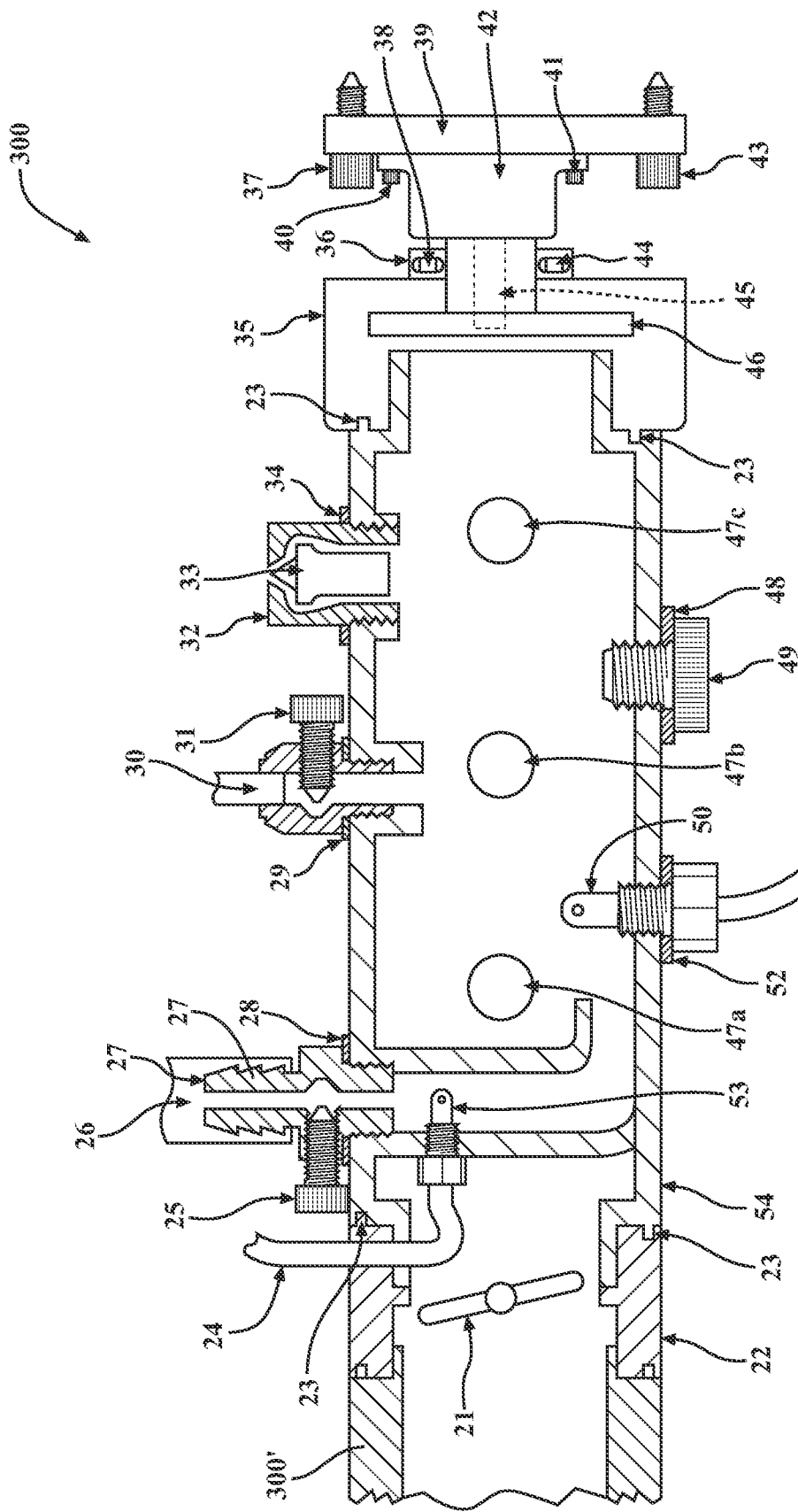
FIG. 3 is a partial section side view of the rain reservoir assembly. The figure illustrates external and internal components, as labeled. Certain components are sectioned while other are not for demonstration purposes only. The figure is not drawn to scale.
Figure 4:
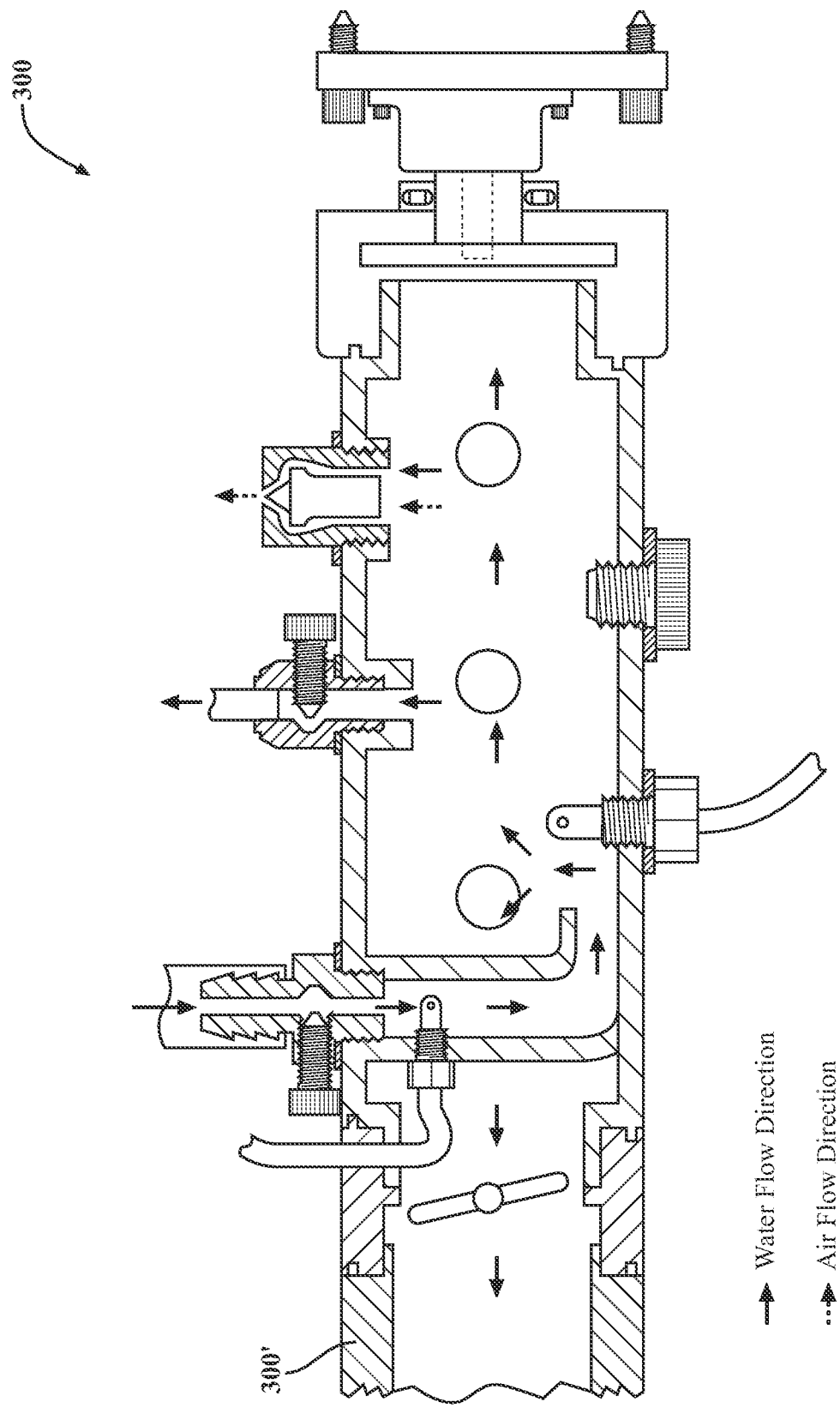
FIG. 4 is a partial section side view of the rain reservoir assembly. The hand sketched figure illustrates the internal flow path and direction of liquid. The figure is not drawn to scale.

FIG. 3 is a partial section view of on half of the reservoir assembly 300, with its external and internal components. The reservoir assembly 300 functions as a liquid inlet to single or multiple nozzle assemblies as an outlet. The nozzle assemblies are identical to the single nozzle assembly 200 described above. The reservoir assembly 300 also acts as a connection equalization buffer medium between a rain system master flow control 400 (described below) and the nozzle assemblies, as well as liquid supply to the nozzle assemblies. The reservoir assembly 300 has multiple outlet ports for mounting nozzle assemblies such that the number of nozzles used can be varied. The flow path and the direction of liquid flow is demonstrated in FIG. 4.

The reservoir assembly 300 serves as a connecting medium and a liquid flow buffer. The rain reservoir body 54 consists of an inlet port 26 that receives liquid from an inlet hose connected to the rain system master flow control 400. The rain reservoir body 54 also includes exit ports 47a, 47b, 47c that each lead to individual nozzle assemblies, identical to the nozzle assembly 200 described above.

A modified fitting 27 with the addition of a flow control adjustment screw 25 is threaded into the inlet 26 to provide inlet flow rate control, which determines the opening size of the inlet port 26 to maintain a desired liquid level in the reservoir assembly 300. If a wired sensor 53 is used, data cable 24 exits the rain reservoir internals from existing openings. The port where sensor 53 is connected can be optionally used to accepts other types of sensors at the inlet flow channel or can be replaced with a plug (not shown) if no sensor 53 is used. The sensor 53 be a pressure, flow temperature or other relevant sensor. Sensors such as a liquid composition sensor 50 are also accepted through ports along the reservoir body 54. While a liquid composition sensor is disclosed it is within the scope of this invention for any other suitable sensor to be used. The liquid composition sensor 50 can be wireless or cable 51 wired. Also shown is an unused sensor port in the reservoir body 54 that is plugged by a threaded cap 49. As liquid level begins to rise within the rain reservoir internal chamber, the internal pressure rises, assuming no liquid is exiting the system at this moment. To prevent damage or unforeseen circumstances, an air relief valve 32 having an air relief valve housing connected to the reservoir body 54. The air relief valve 32 contains a lightweight poppet 33 that remains steady in position and allows air to travel around its surroundings as liquid level rises. When liquid level reaches the poppet height, the poppet 33 is pushed upward by the liquid and seals shut against an aperture of the air relief valve housing, providing a closed system for normal operation. If air bubble is present inside the system, the bubble travels upward into the air relief valve 32 and escapes around the aperture. When the liquid level continues to rise after the volume of the rain reservoir internal chamber is already fulfilled, an overflow port 30 activates to provide an additional outlet to reduce the pressure build-up within the reservoir assembly. The overflow port 30 can be custom controlled through the use of an adjustment screw 31 to control the flow opening of the overflow port 30. The overflow port 30 exit is connected to a hose, the liquid flow travels into the rain system master flow control 400, which is described in greater detail below. The rain reservoir assembly 300 is modularly designed and offers twist locks 23 be connected to either another rain reservoir 300' through valved coupler 22 or an end cap subassembly 35, 35'. A butterfly valve 21 is positioned inside the valved coupler 22 is independently controlled and determines the flow connection or isolation of each rain reservoir assembly 300. While a butterfly valve 21 is shown it is within the scope of this invention for any suitable valve to be used. Each rain reservoir assembly 300 can function as a standalone unit or connected together as part of a larger assembly rain reservoir assembly series 310.

The reservoir assembly 300 as shown in FIG. 3 is one half of the assembly, while both ends include end cap subassembly 35, 35' used at each end of the rain reservoir assembly 200 to allow rotational movement. A base plate 39 is used and houses a motor 42, attached together by machine screws 40, 41. The motor 42 can be manually turned or electronically controlled. The motor 42 has a spindle 45 connected to a bearing assembly 46, fixed to the rotatable end cap. The motor spindle housing uses a two-piece locking ring 36 with two set screws 38, 44 to ensure tightness. The base plate is ultimately mounted to the rain system support rack side bracket through screws 37, 43. Liquid sealing washers 28, 29, 34, 48, 52 are used throughout the exterior fitting ports to prevent undesired leakage.

Figure 5:
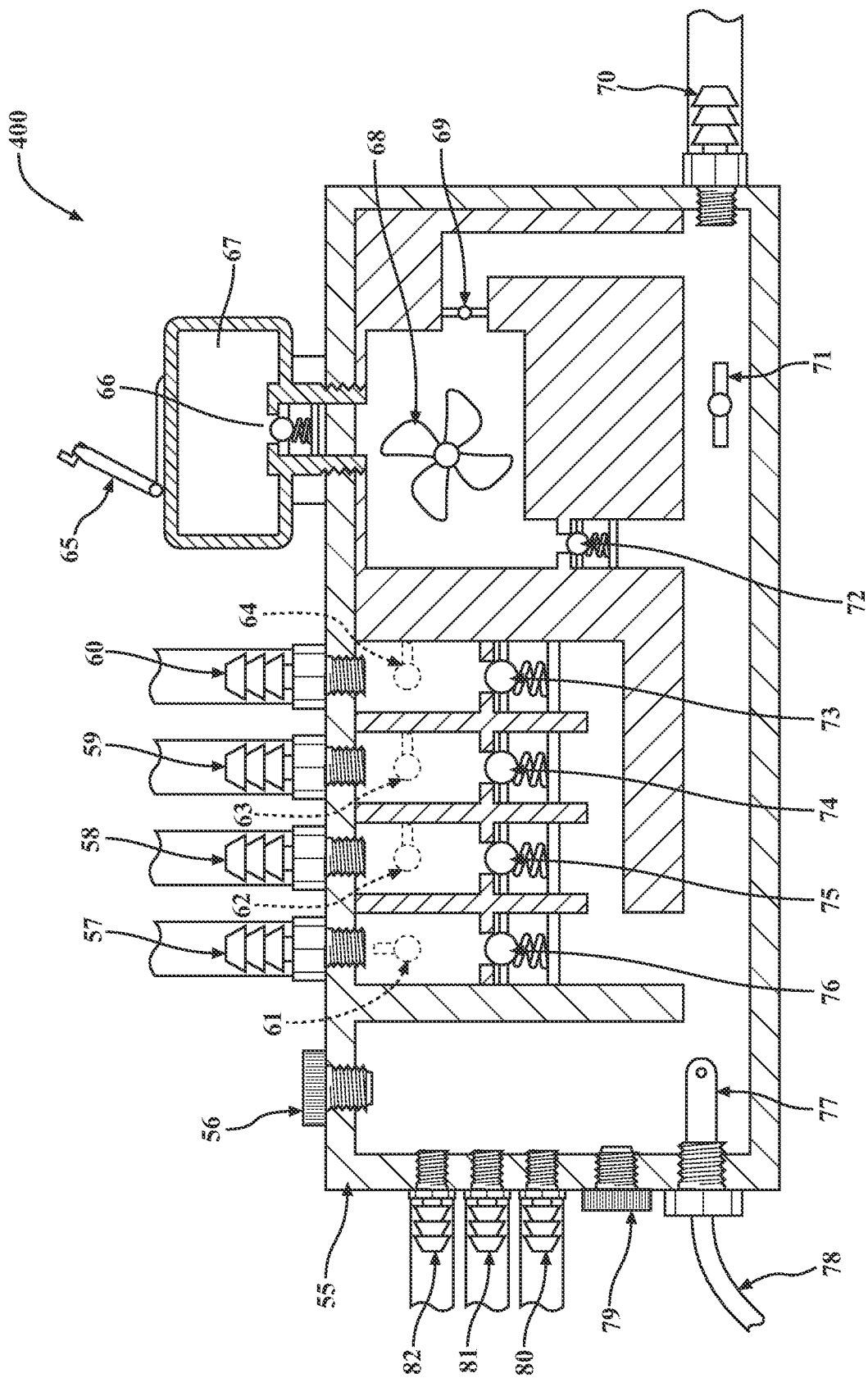
FIG. 5 is a partial section side view of the rain system master flow control. The figure illustrates the external and internal components, labeled. Certain components are sectioned while others are not for demonstration purposes only. The figure is not drawn to scale.
Figure 6:
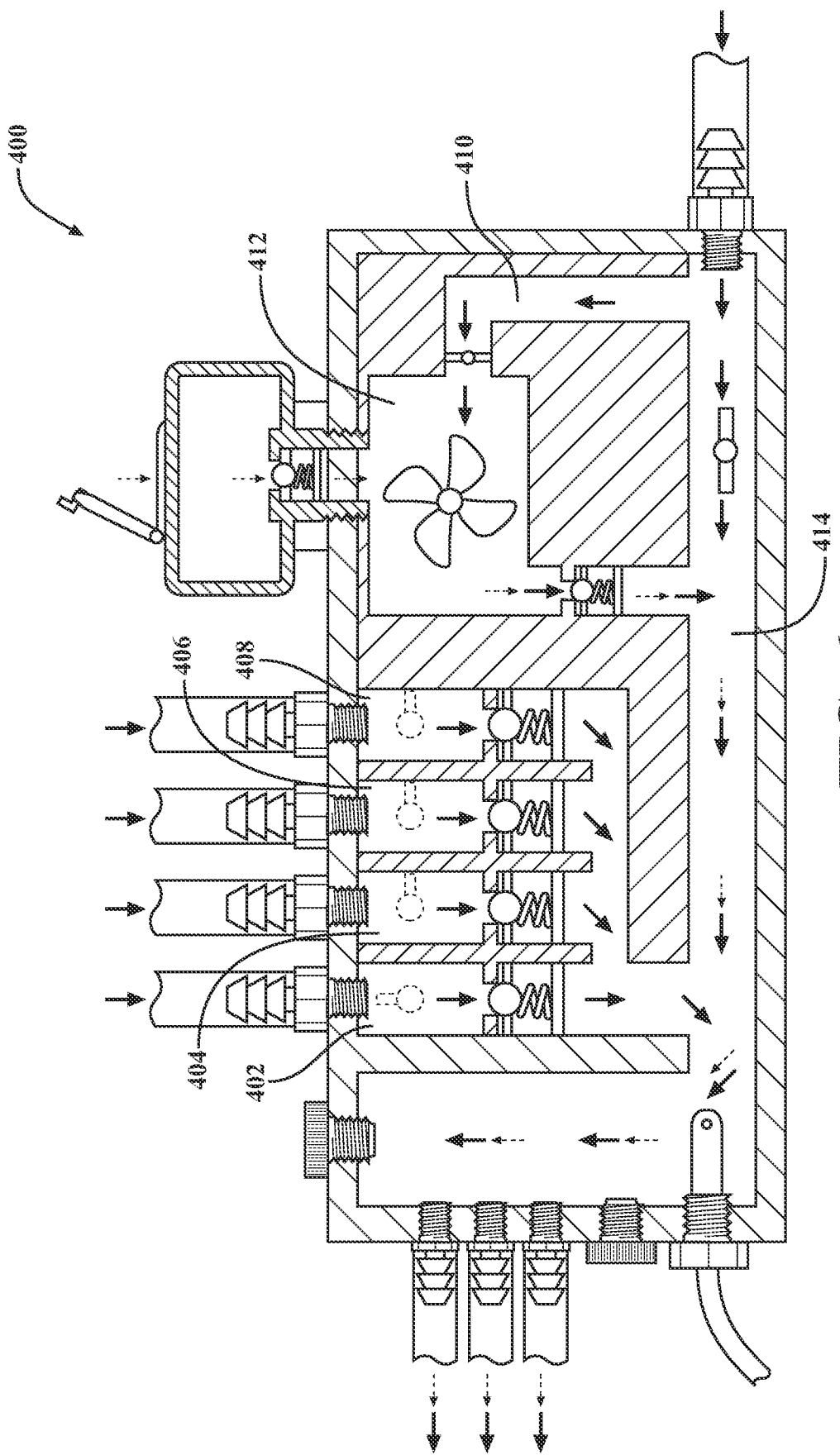
FIG. 6 is a partial section side view of the rain system master flow control. The figure illustrates the external and internal flow path and direction of liquid, and potential liquid-soluble chemical mixture with appropriate legends. The figure is not drawn to scale.

FIG. 5 is a partial section view of the rain system master flow control 400 that provides the functionality to control the flow characteristics supplied to each reservoir assembly in use. The internal and external fluid flow paths and directions are shown in FIG. 6. Flow characteristics that can be controlled by the rain system master flow control 400 include but not limited to flow rate, velocity and pressure. The rain system master flow control 400 is equipped with a main inlet 70, overflow inlets 57, 58, 59, 60, and outlet ports 80, 81, 82, each of which can be independently controlled based on application needs. Various routing solutions are possible to selectively include or exclude use of subsystems such as overflow control, or multiple rain reservoirs.

A flow control body 55 consists of multiple internal flow channels to act as a master connection medium between the inlets and the outlets. The main inlet 70 is a threaded standardized fitting and is connected to the main liquid supply through a hose. A valve that is shown as a butterfly valve 71 is placed after the inlet 70 in a main channel 414 to control the operating status (on/off) of the master flow control, which directly translates to the operation status of the entire rain simulation system. While a butterfly valve 71 is shown it is within the scope of this invention for any suitable type of valve to be used. Overflows from the rain reservoir assembly 300, which can also be multiple rain reservoirs are also considered as liquid inlets. The rain system master flow control 400 provides standardized threaded fittings that provide overflow inlets 57, 58, 59, 60 that accept the overflow hoses from each four reservoir assemblies independently. Each of the four reservoir assemblies are identical to reservoir assembly 300 described above. While the rain system master flow control 400 is described herein as having four overflow inlets 57, 58, 59, 60 each receiving overflow from one of four reservoir assemblies, it is within the scope of the invention for a greater or lesser number of reservoir assemblies and overflow inlets to be implemented. Each overflow inlet 57, 58, 59, 60 leads to a one of four settling chambers 402, 404, 406, 408 where the liquid can settle so that air can be purged or liquid can be removed if contaminants are detected. Each settling chamber 402, 404, 406, 408 includes a bleed valve 61, 62, 63, 64 that is manually operated for purging of air or liquid. The bleed valve 61, 62, 63, 64 can be opened or closed depending on if an open system or a closed system is desired for each rain reservoir subsystem. One-way check valves 73, 74, 75, 76 are in place in one of the four settling chambers 402 404, 406, 408 to prevent backflowing of liquid or air under partial vacuum condition inside the overflow settling chambers 402 404, 406, 408. Each of the four settling chambers 402 404, 406, 408 lead to the main channel 414 as liquid passes through a respective outlet through a one-way check valve 73, 74, 75, 76.

Split off from the main inlet 70, a channel 410 diverts source liquid flow into a mixing chamber 412. The mixing chamber 412 accepts additives including chemical compounds or solutions that are soluble with liquid from a manual compartment 67. In addition, the rain system master flow control 400 allows for receiving and mixing foreign substances such as salt and acid to precisely control the chemical composition of the liquid supplied to the rain reservoirs. This allows for testing of applications such as dissolved-salt and acidic liquid exposure to simulate winter driving and acidic rain conditions, respectively. The flow routing can be customized at will to be a one-way system where liquid is drained directly or can be recirculated with a collection system.

The manual compartment 67 has a sealable lid 65 and a one-way check valve 66 to prevent accidental chemical leakage leading to exposure. Proper mixing occurs through a mixer 68 that is a propeller-blade driven mixer at low speed. The mixer 68 mixes liquid diverted from the main inlet with the additives, which is then reintroduced to the main channel 414. The mixing chamber 412 has butterfly valve 69 to control the liquid inlet. The valve opens to allow liquid to enter the mixing chamber 412 and closes when sufficient liquid level is achieved within the mixing chamber 412 Another one-way check valve 72 is present at the exit of the mixing chamber 412 to prevent undesired contamination of source liquid flow. Sensors such as a fluid composition sensor 77 is placed near the exit of the flow path, which can be wireless or cable 78 wired. There is also an unused sensor ports are sealed using a plug 79 that is a threaded liquid-tight machine screw. The exit of the flow path consists of multiple outlets 80, 81, 82 that are standardized threaded fittings connected to hoses. The hoses connect directly to rain reservoir. Similar to sensor ports, unused outlet ports can be capped using a plug 56 that is a liquid-tight machine screw. Differ from sensor ports, unused outlet ports can be converted directly into additional inlet ports for unique testing applications. All of the above features and adjustments allow the rain system master flow control 400 to be adjusted to provide a desired flow rate, velocity and degree of pressure of the liquid droplets emitted from each nozzle assembly.

Figure 7:
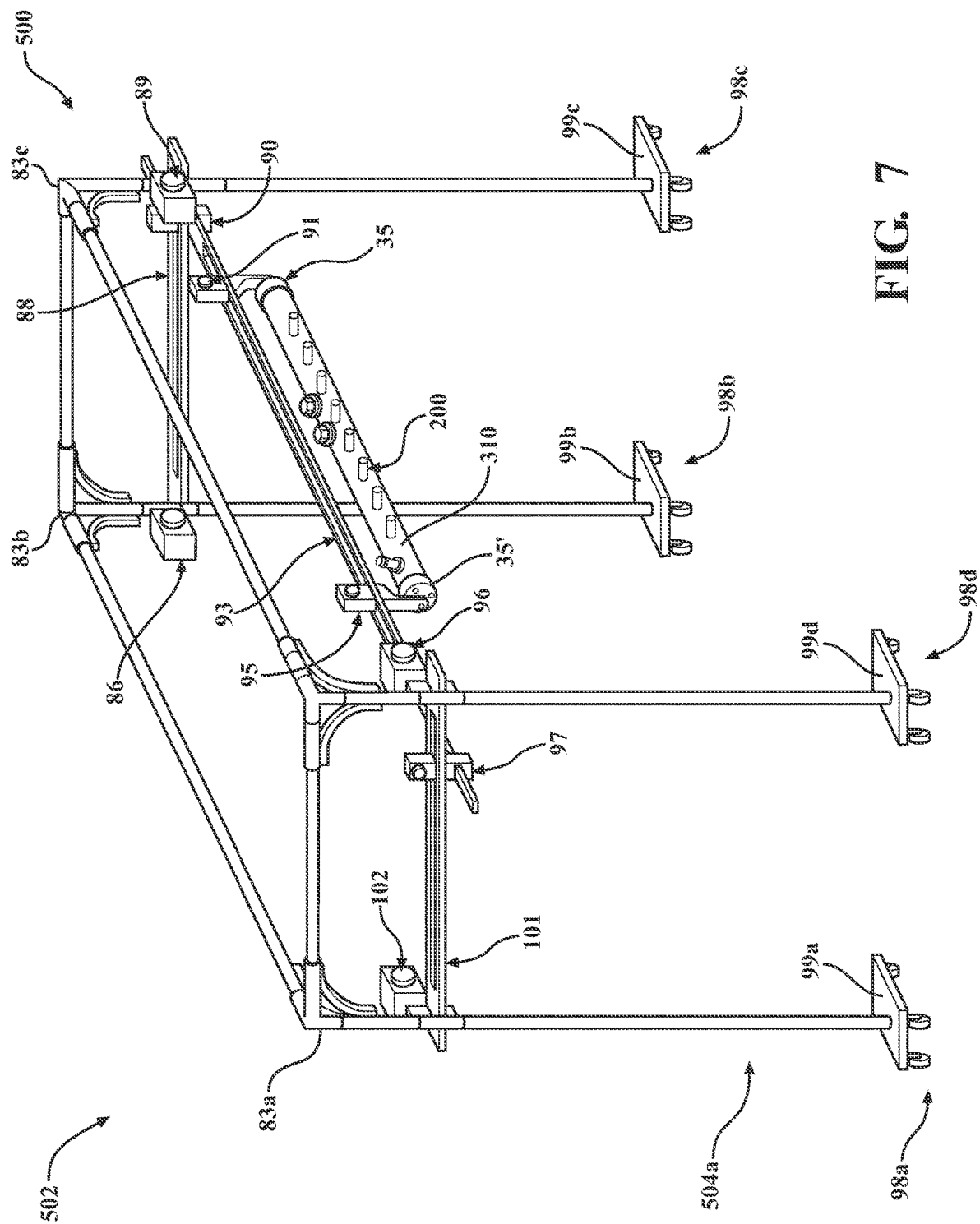
FIG. 7 is an isometric view of the rain system support rack. The figure illustrates the external components of the support rack assembly. Subassemblies such as rain nozzle and rain reservoir are included in the figure for demonstration purposes. The figure is not drawn to scale.

FIG. 7 is an isometric view of a support rack 500 of a rain system 502 that applies a predetermined rain pattern having at least one parameter to a stationary vehicle in a test zone 506. The at least one parameter is applied to a test zone includes parameters such as perceived rain angle, droplet size and droplet impact velocity. The test zone 506 is schematically shown as being below at an area beneath and surrounding the support rack 500. The reason for this is if the support rack 500 is placed in a wind tunnel, a wind source 508 such as a fan flows can blow air at a high enough velocity that the test zone 506 can be in a region outside of the vertical area below the support rack 500. When the wind source 508 is used the wind will force the rain the droplets in a generally horizontal direction after falling vertically from the nozzle assembly 300 causing the rain droplet to strike a vehicle in the test zone 506 at a perceived wind angle and rain angle similar to what is encountered in real word driving conditions. Using the known parameters that can be set by the components of the rain system 502 the parameters of perceived rain angle, droplet size, and droplet impact velocity can be adjusted and presented to a stationary test vehicle in the rain system 502.

Figure 8:
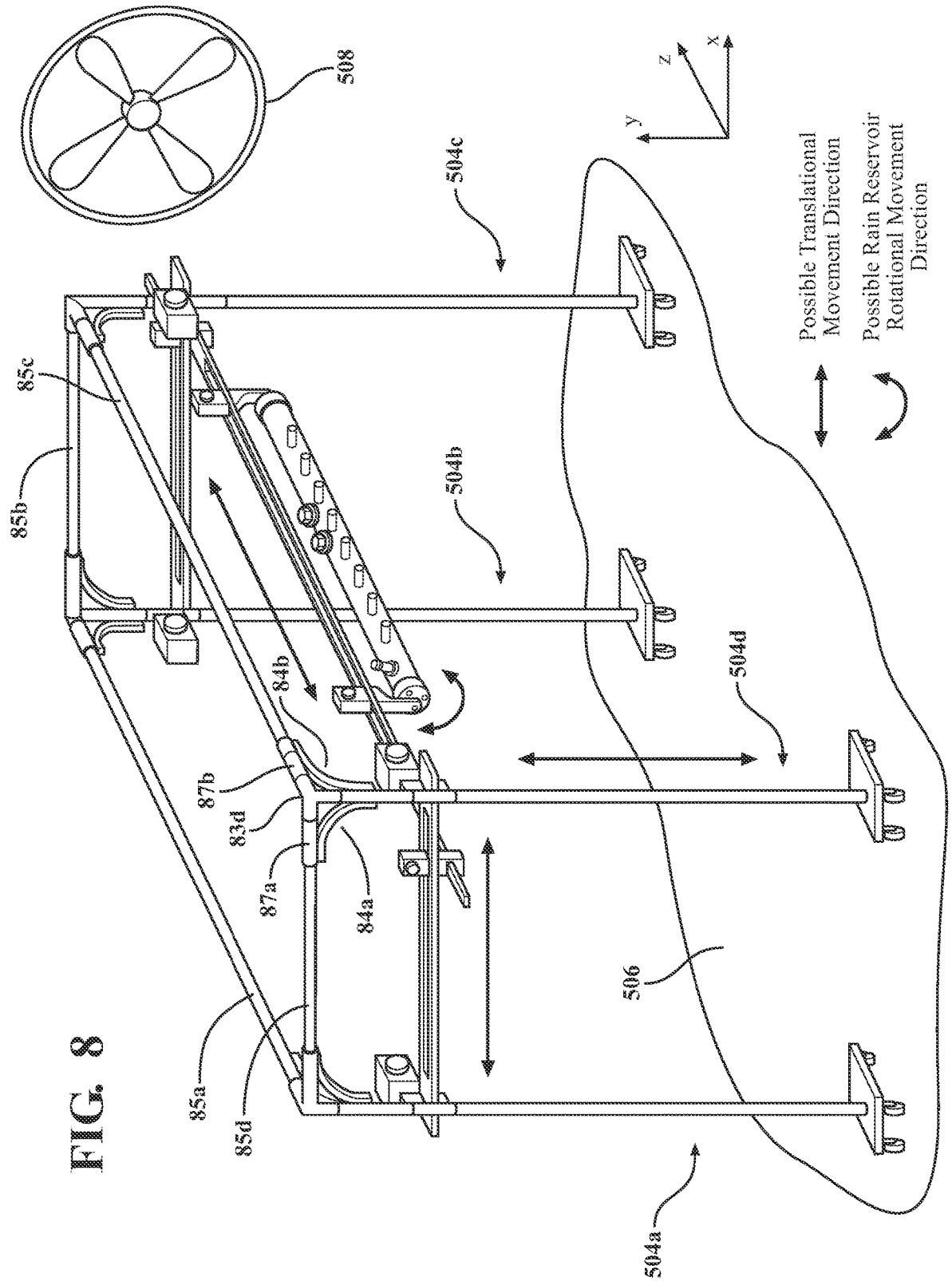
FIG. 8 is an isometric view of the rain system support rack. The figure illustrates the possible degrees of freedom of motion of the components within the rain system support rack assembly. Direction arrows are placed at position of motion-enabling mechanism. The Cartesian coordinate system (i.e., x, y, z) is indicated. The figure is not drawn to scale.

Regarding the test zone 506, it is within the scope of the invention for the test zone 506 to not limited to the region shown in FIG. 8 and can vary depending on test conditions. The support rack 500 features mechanisms allowing degrees of freedom for the reservoir assembly 300 and nozzle assembly 200 subsystems. The direction of the degrees of freedom is displayed in FIG. 8, with a x-y-z-direction coordinate system. The support rack 500 consists of a main wireframe-like shell construction as main body. The main body includes four vertical legs 504a, 504b, 504c, 504d each having a base plate 99a, 99b, 99c, 99d with lockable wheels 98a, 98b, 98c, 98d, which can be manually moved when unlocked and locked when desired position is achieved, and stability is now desired.

Horizontal bars 85a, 85b, 85c, 85d are connected between two vertical legs 504a, 504b, 504c, 504d forming a top ring of the support rack 500. A tee coupler 83a, 83b, 83c, 83d each is at each corner of the top ring and connects one of the vertical legs 504a, 504b, 504c, 504d with two of the horizontal bars 85a, 85b, 85c, 85d. As shown tee coupler 83a connects leg 504a and horizontal bars 85a, 85d, tee coupler 83b connects horizontal bars 85a, 85b, tee coupler 83c connects horizontal bars 85b, 85c, and tee coupler 83d connects horizontal bars 85c, 85d. Each tee coupler 83a, 83b, 83c, 83d is reinforced using arc-shaped support 84a, 84b, which is visible in the drawings but only labelled on tee coupler 83d. Also, each tee coupler is securely mounted to each of the bar with locking ring 87a, 87b. Given that every testing scenario differs, the construction and design of the support rack 500 is not specifically limited and allows for freedom to modify and optimize to suit various needs. This makes the support rack 500 modular, for example different length vertical legs 504a, 504b, 504c, 504d or horizontal bars 85a, 85b, 85c, 85d can be used depending on the height and size needed. Also, the number of reservoirs assemblies and rain nozzle assemblies can be varied depending on the need of a particular application.

To allow movement of the reservoir assembly 300, the support rack 500 holds one z-direction railing 93, and two x-direction railings 88, 101, connected together by a motorized bracket 90, 97 at each end. On the z-direction railing, motorized brackets 91, 95 are used to support each end of rain reservoir 200 at the end cap subassembly 35, 35'. The motorized brackets allow for translational movement in the particular direction at which they are mounted, as seen in FIG. 8. Vertically, motorized brackets 86, 89, 96, 102 are used at each of the vertical bar. The brackets provide a y-direction translational movement of the entire movement-enabling subassembly, including the rain reservoir and the rain nozzle subsystems. The rain system 502 components including the rain system master flow control, the reservoir assembly and the nozzle assembly are adjustable to that the liquid from the nozzle assembly forms a predetermined rain pattern of rain droplets with at least one parameter to a test zone.

The support rack 500 offers various adjustability in translational and rotational movement to the rain reservoir subassembly. The reservoir assembly 300 is able to be moved horizontally in either direction and vertically up and down. The movement capability of the reservoir assembly 300 allows fine adjustment to better suit testing condition needs. In the case of wind-driven rain test, the support and controller are preferably placed outside of the wind stream, however, part of or the entire support rack 500 can be within the wind stream when needed, provided that the construction is adequately robust to withstand the wind force. The support rack 500 holds the nozzle assembly 200, reservoir assembly 300, and other assemblies such as the liquid supply and overflow control assembly. At the top of the support rack 500, a multi-railing system is located. The multi-railing system allows translational relocation the reservoir assembly 300. The reservoir assembly 300 is mounted to the center-spanning-railing brackets. When the railing moves to the targeted position, the mounting point is locked. The lock provides a secure and steady construction under testing conditions. The operation of the railing and locks can be controlled remotely or directly with independent or linked controllers. The control system can be manual, electronic, or hybrid mechanisms, etc. The support rack 500 is made portable, such that the rain reservoirs can be positioned in a slanted manner for testing in crosswind conditions. When the testing condition requires a greater coverage of rain, the rain system support rack with its upper multi-railing subassembly can be connected to additional support racks as required.

The description of the invention is merely exemplary in nature and, thus, variations that do not depart from the essence of the invention are intended to be within the scope of the invention. Such variations are not to be regarded as a departure from the spirit and scope of the invention.

What is claimed:

1. A rain simulation system comprising:
   at least one nozzle assembly for dispensing a liquid;
   at least one reservoir assembly connected to the at least one nozzle assembly for supplying the liquid to the at least one nozzle assembly;
   a support rack for supporting the at least one nozzle assembly and the at least one reservoir assembly; and,
   a rain system master flow control for controlling the flow and pressure of the liquid inputted to the at least one reservoir assembly, wherein the rain system master flow control, the support rack, the at least one reservoir assembly and the at least one nozzle assembly are adjustable so that the liquid from the at least one nozzle assembly forms a predetermined rain pattern of rain droplets with at least one parameter to a test zone.

2. The rain simulation system of claim 1 further comprising a wind source for forcing the rain droplets in a generally horizontal direction after the rain droplets fall vertically from the at least one nozzle assembly.

3. The rain simulation system of claim 1 wherein the at least one parameter is one or more of a perceived rain angle, a droplet size, and a droplet impact velocity, where the at least one parameter can be adjusted and presented to a test vehicle.

4. The rain simulation system of claim 1 wherein the at least one nozzle assembly includes multiple nozzles that are adjustable for flow rate and degree of pressure compensation.

5. The rain simulation system of claim 1 wherein the rain system master flow control adjusts the flow rate, velocity and pressure of the liquid droplets.

6. The rain simulation system of claim 1 wherein the at least one nozzle assembly includes:
an inlet connected to the at least one reservoir assembly;
an internal channel connected to the inlet, and
a flow rate controlling adjustment screw that controls an opening of the internal channel to control the flow of liquid through the opening.

7. The rain simulation system of claim 6 wherein adjustment of the flow rate controlling adjustment screw is performed externally by physically turning the flow rate controlling adjustment screw inboard or outboard.

8. The rain simulation system of claim 6 wherein the at least one nozzle assembly further comprises a pressure compensation mechanism having two plates connected by a spring positioned in the internal channel, wherein the pressure compensation mechanism is adjustable to control the pressure of liquid flowing through an outlet of the at least one nozzle assembly.

9. The rain simulation system of claim 8 wherein the pressure compensation mechanism further comprises a threaded bolt contacting one of the two plates, wherein the threaded bolt is rotatable to increase or decrease a compression of the spring and change a pressure threshold of the liquid flow to displace the spring that changes the pressure regulation of liquid flowing through the outlet of the at least one nozzle assembly.

10. The rain simulation system of claim 1, wherein the at least one nozzle assembly further comprises a pressure compensation mechanism having two plates connected by a spring, wherein the pressure compensation mechanism is adjustable to control the pressure of a liquid flowing through an outlet of the at least one nozzle assembly.

11. The rain simulation system of claim 10, wherein the pressure compensation mechanism further comprises a threaded bolt contacting one of the two plates, wherein the threaded bolt is rotatable to increase or decrease a compression of the spring and change a pressure threshold of the liquid flow to displace the spring that changes the pressure regulation of the liquid flowing through the outlet of the at least one nozzle assembly.

12. The rain simulation system of claim 1, wherein the at least one reservoir assembly further comprises:
an inlet port in a reservoir body of the at least one reservoir assembly that accepts liquid from the rain system master flow control and at least one exit port connected to the at least one nozzle assembly, and
a flow control adjustment screw is threaded into the inlet port to control the opening size of the inlet port and maintain a desired liquid level in the at least one reservoir assembly.

13. The rain simulation system of claim 12, wherein the at least one reservoir assembly further comprises a liquid composition sensor connected through the reservoir body of the at least one reservoir assembly.

14. The rain simulation system of claim 12, wherein the at least one reservoir assembly further comprises an air relief valve connected to the reservoir body that allows air in the reservoir body to escape, but closes when liquid in the reservoir body reaches the air relief valve.

15. The rain simulation system of claim 12, wherein the at least one reservoir assembly further comprises:
an overflow port connected to the rain system master flow control, and
an adjustment screw to control the flow opening of the overflow port.

16. The rain simulation system of claim 15, wherein the at least one reservoir assembly further comprises:
at least two twist locks on the reservoir body each being connectable to one of another reservoir body through a valved coupler and an end cap subassembly.

17. The rain simulation system of claim 1 wherein the at least one reservoir assembly further comprises an end cap subassembly at each end of the at least one reservoir assembly to allow rotational movement of the at least one reservoir assembly relative to each end cap subassembly.

18. The rain simulation system of claim 17 wherein each end cap subassembly includes a motor.

19. The rain simulation system of claim 1 wherein the rain system master flow control further comprises:
a main inlet for receiving the liquid that will be flowed to the at least one nozzle assembly;
at least one outlet connected to the at least one reservoir assembly;
a flow control body having multiple internal flow channels, including a main channel to act as a master connection medium between the main inlet and the at least one outlet, and
a valve placed within the main channel to control liquid flow relative to the main inlet.

20. The rain simulation system of claim 19 wherein the rain system master flow control further comprises at least one settling chamber connected to an overflow of the at least one reservoir assembly for receiving liquid from the at least one reservoir assembly and selectively inputting the liquid to the main channel.

21. The rain simulation system of claim 20 further comprising:
a bleed valve connected to the at least one settling chamber for removing air or liquid from the at least one settling chamber, and
a check valve located at an outlet of the at least one settling chamber to prevent back flow.

22. The rain simulation system of claim 19 further comprising:
a channel that is a split off from the main channel that diverts liquid from the main inlet to a mixing chamber;
wherein the mixing chamber includes a mixer for mixing additives with the liquid and then reintroducing the liquid and additives back to the main channel.

23. The rain simulation system of claim 1 wherein the support rack includes mechanisms allowing degrees of freedom for the at least one reservoir assembly and at least one nozzle assembly.

24. The rain simulation system of claim 23 wherein the mechanisms include a multi-railing system that allows translational relocation the at least one reservoir assembly and a plurality of motorized brackets allowing for movement of the at least one reservoir assembly and the at least one nozzle assembly in the X direction, Y direction and Z direction.

25. A rain simulation system, comprising:
at least one nozzle assembly for dispensing a liquid wherein the at least one nozzle assembly includes an inlet connected to at least one reservoir assembly, an internal channel connected to the inlet, and a flow rate controlling adjustment screw that controls an opening of the internal channel to control the flow of liquid through the opening;

the at least one reservoir assembly is connected to the at least one nozzle assembly for supplying the liquid to the at least one nozzle assembly, wherein the at least one reservoir assembly includes an inlet port in a reservoir body of the at least one reservoir that accepts liquid from a rain system master flow control and at least one exit port connected to the at least one nozzle assembly, and the flow control adjustment screw is threaded into the inlet to control the opening size of the inlet port and maintain a desired liquid level in the at least one reservoir assembly;

a support rack for supporting the at least one nozzle assembly and the at least one reservoir assembly; and, the rain system master flow control for controlling the flow and pressure of the liquid inputted to the at least one reservoir assembly, wherein the rain system master flow control, the support rack, the at least one reservoir assembly and the at least one nozzle assembly are adjustable so that the liquid from the at least one nozzle assembly forms a predetermined rain pattern of rain droplets with at least one parameter to a test zone.

26. The rain simulation system of claim 25 further comprising a wind source for forcing the rain droplets in a generally horizontal direction after the rain droplets fall vertically from the at least one nozzle assembly.

27. The rain simulation system of claim 25 wherein the at least one parameter is one or more of a perceived rain angle, a droplet size, and a droplet impact velocity, where the at least one parameter can be adjusted and presented to a stationary test vehicle.

28. The rain simulation system of claim 25 wherein the at least one nozzle assembly includes multiple nozzles that are adjustable for flow rate and degree of pressure compensation.

29. The rain simulation system of claim 25 wherein the rain system master flow control adjusts the flow rate, velocity and pressure of the liquid droplets.

30. The rain simulation system of claim 29 wherein adjustment of the flow rate controlling adjustment screw is performed externally by physically turning the flow rate controlling adjustment screw inboard or outboard.

31. The rain simulation system of claim 29 wherein the at least one nozzle assembly further comprises a pressure compensation mechanism having two plates connected by a spring positioned in the internal channel, wherein the pressure compensation mechanism is adjustable to control the pressure of liquid flowing through an outlet of the at least one rain-nozzle assembly.

32. The rain simulation system of claim 31 wherein the pressure compensation mechanism further comprises a threaded bolt contacting one of the two plates, wherein the threaded bolt is rotatable to increase or decrease a compression of the spring and change a pressure threshold of the liquid flow to displace the spring that changes the pressure regulation of liquid flowing through the outlet of the at least one nozzle assembly.

33. The rain simulation system of claim 25, wherein the at least one nozzle assembly further comprises a pressure compensation mechanism having two plates connected by a spring, wherein the pressure compensation mechanism is adjustable to control the pressure of a liquid flowing through an outlet of the at least one rain nozzle assembly.

34. The rain simulation system of claim 33, wherein the pressure compensation mechanism further comprises a threaded bolt contacting one of the two plates, wherein the threaded bolt is rotatable to increase or decrease a compression of the spring and change a pressure threshold of the liquid flow to displace the spring that changes the pressure regulation of the liquid flowing through the outlet of the at least one nozzle assembly.

35. The rain simulation system of claim 34, wherein the at least one reservoir assembly further comprises a liquid composition sensor connected through the reservoir body of the at least one reservoir assembly.

36. The rain simulation system of claim 34, wherein the at least one reservoir assembly further comprises an air relief valve connected to the reservoir body that allows air in the reservoir body to escape, but closes when liquid in the reservoir body reaches the air relief valve.

37. The rain simulation system of claim 34, wherein the at least one reservoir assembly further comprises:
an overflow port connected to the rain system master flow control, and
an adjustment screw to control the flow opening of the overflow port.

38. A rain simulation system, comprising:
at least one nozzle assembly for dispensing a liquid wherein the at least one nozzle assembly includes an inlet connected to at least one reservoir assembly, an internal channel connected to the inlet, and a flow rate controlling adjustment screw that controls an opening of the internal channel to control the flow of liquid through the opening;

the least one reservoir assembly is connected to the at least one nozzle assembly for supplying the liquid to the at least one nozzle assembly, wherein the at least one reservoir assembly includes an inlet port in a reservoir body of the at least one reservoir that accepts liquid from a rain system master flow control and at least one exit port connected to the at least one nozzle assembly, and the flow control adjustment screw is threaded into the inlet to control the opening size of the inlet port and maintain a desired liquid level in the at least one reservoir assembly;

a support rack for supporting the at least one nozzle assembly and the at least one reservoir assembly;

the rain system master flow control for controlling the flow and pressure of the liquid inputted to the at least one reservoir assembly, wherein the rain system master flow control, the support rack, the at least one reservoir assembly and the at least one nozzle assembly are adjustable so that the liquid from the at least one nozzle assembly forms a predetermined rain pattern of rain droplets with at least one parameter to a test zone; and wherein the rain system master flow control further comprises a main inlet for receiving the liquid that will be flowed to the at least one nozzle assembly, at least one outlet connected to the at least one reservoir assembly, a flow control body having multiple internal flow channels, including a main channel to act as a master connection medium between the main inlet and the at least one outlet and a valve placed within the main channel to control liquid flow relative to the main inlet.

39. The rain simulation system of claim 38 further comprising at least one settling chamber connected to an overflow of the at least one reservoir assembly for receiving liquid from the at least one reservoir assembly and selectively inputting the liquid to the main channel.

40. The rain simulation system of claim 39 further comprising:

a bleed valve connected to the at least one settling chamber for removing air or liquid from the at least one settling chamber, and a check valve located at an outlet of the at least one settling chamber to prevent back flow.

41. The rain simulation system of claim 39 further comprising:

a channel that is a split off from the main channel that diverts liquid from the main inlet to a mixing chamber;

wherein the mixing chamber includes a mixer for mixing additives with the liquid and then reintroducing the liquid and additives back to the main channel.

\* \* \* \* \*